US008982145B2

(12) United States Patent
Hernandez et al.

(10) Patent No.: US 8,982,145 B2
(45) Date of Patent: Mar. 17, 2015

(54) DISPLAY ERROR INDICATIONS

(75) Inventors: Nestor F. Hernandez, San Francisco, CA (US); Dmitriy Portnov, San Jose, CA (US); Mengya Tang, Mountain View, CA (US); Ankit Jain, Mountain View, CA (US)

(73) Assignee: Google Inc., Mountain View, CA (US)

( * ) Notice: Subject to any disclaimer, the term of this patent is extended or adjusted under 35 U.S.C. 154(b) by 237 days.

(21) Appl. No.: 13/600,630

(22) Filed: Aug. 31, 2012

(65) Prior Publication Data

US 2014/0063042 A1    Mar. 6, 2014

(51) Int. Cl.
G09G 5/00 (2006.01)
G09G 5/02 (2006.01)
H04N 5/222 (2006.01)
H04N 5/445 (2011.01)
G06F 17/00 (2006.01)
G06F 3/048 (2013.01)
G06F 9/44 (2006.01)
G09G 5/36 (2006.01)

(52) U.S. Cl.
CPC .. G09G 5/00 (2013.01); G06F 8/38 (2013.01); G09G 5/363 (2013.01); G09G 2330/12 (2013.01); G09G 2340/14 (2013.01); G09G 2354/00 (2013.01)
USPC ........... 345/592; 345/581; 345/619; 345/689; 348/333.05; 348/333.12; 348/564; 715/273; 715/764

(58) Field of Classification Search
USPC ......... 345/581, 589, 592, 616, 618–619, 636, 345/689, 530, 538, 548; 348/333.05, 348/333.11, 333.12, 552, 563–564, 576, 348/596–597; 358/448, 552; 382/176, 178, 382/254; 715/200, 273, 277, 246–247, 700, 715/764, 765, 781, 788, 838
See application file for complete search history.

(56) References Cited

U.S. PATENT DOCUMENTS 6,799,286 B1   9/2004 Evans
7,088,358 B2   8/2006 Aharon et al.
7,380,214 B1   5/2008 Giormov (Continued)

FOREIGN PATENT DOCUMENTS

JP    2007122230 A    5/2007

OTHER PUBLICATIONS

Transmittal of the International Search Report and the Written Opinion of the International Searching Authority for PCT/US2013/057208 dated Dec. 26, 2013, 10 pages.

*Primary Examiner* — Wesner Sajous
(74) *Attorney, Agent, or Firm* — Fish & Richardson P.C.

(57) ABSTRACT

Methods, systems, and apparatus for generating and providing display error indications. In one aspect, a method includes accessing data defining display areas and, for each display area: respective display area borders that are different from display area borders of other display areas; and display data for each of a plurality of objects that are rendered in the display area, the display data defining, for each object: a display position of the object; display dimensions of the object; and content data defining content of the object; wherein each object in each display area corresponds to a respective object in each other display area; receiving user input specifying a change in the display data of a first object in a first display area and, in response, determining whether the change causes a display error; and for each display area for which the change causes a display error, generating an error indication.

17 Claims, 7 Drawing Sheets

(56) References Cited

U.S. PATENT DOCUMENTS

2004/0253991 A1* 12/2004 Azuma .................. 455/566
2006/0288004 A1* 12/2006 Toriyama .................. 707/6
2007/0126732 A1* 6/2007 Robertson et al. ............ 345/419
2010/0040399 A1* 2/2010 Van Pottelberghe et al. ... 400/76
2011/0113371 A1 5/2011 Parker
2011/0231790 A1 9/2011 Forstall
2012/0038664 A1 2/2012 Sheasby et al.
2013/0129231 A1* 5/2013 Dale et al. .................. 382/224

* cited by examiner

DISPLAY ERROR INDICATIONS

BACKGROUND

This specification relates to generating and providing display error indications.

Display graphics, such as visual works of art, advertisements, entertainment graphics, and educational materials, are created for many reasons. Display graphics are often created using computers and may be distributed via the Internet. When users create display graphics for distribution via the Internet, the display graphics may require review to determine whether the display graphics are suitable for distribution with resources. A review of display graphics may also be designed to ensure mistakes were not made when creating the display graphics. In addition, a user who creates a display graphic may wish to create multiple sizes of a display graphic for distribution with resources having space constraints, and each size display graphic may require independent review.

One example type of display graphic distributed via the Internet is a display advertisement. Advertisers create display advertisements for distribution with resources that are owned by publishers. An advertisement server may facilitate creation and distribution of advertisements with various resources, and a manual review of display advertisements for errors may be required. However, reviewing display advertisements for errors may be time consuming and expensive for individual users and advertisement servers.

SUMMARY

This specification describes technologies relating to generating and providing display error indications.

In general, one innovative aspect of the subject matter described in this specification can be embodied in methods that include the actions of accessing data defining a plurality of display areas, the data defining, for each display area: respective display area borders that are different from display area borders of other display areas in the plurality of display areas; and display data for each of a plurality of objects that are rendered in the display area, the display data defining, for each object: a display position of the object within the display area; display dimensions of the object; and content data defining content of the object; wherein each object in each display area corresponds to a respective object in each other display area; receiving user input specifying a change in the display data of a first object in a first display area and, in response, determining whether the change causes a display error for the first object in the first display area and for any respective object in each of the other display areas; and for each display area for which the change causes a display error, generating an error indication for the display area. Other embodiments of this aspect include corresponding systems, apparatus, and computer programs, configured to perform the actions of the methods, encoded on computer storage devices.

These and other embodiments can each optionally include one or more of the following features. The display error for an object may indicate at least one of the following: the content of the object intersects with content of another object included in the same display area; the content of the object intersects with a display area border of the display area that includes the object; the content of the object exceeds the display dimensions of the object; and the content of the object intersects with a background of the display area that includes the object and the color of the background is substantially similar to the color of the content.

An intersection of content may be defined by two or more non-transparent pixels occupying the same location of a display area. An intersection of the content of an object with a display area border may be defined by at least a portion of the content exceeds the area defined by the display area border.

The error indication for the first display area may comprise text specifying a cause of the error. Each display area may have a corresponding thumbnail representation, and wherein the error indication for each other display area may comprise an adjustment to the thumbnail representation of the other display area. The error indication, for each of the display areas for which the change caused a display error, may comprise an adjustment to the object for which the change caused a display error.

Particular embodiments of the subject matter described in this specification can be implemented so as to realize one or more of the following advantages. Users may manipulate objects in a display area and be provided with error indications that identify potential display problems with the display area or within another display area the user is not currently viewing. Display error determinations may be made at a user device, without requiring communication with a separate data processing apparatus, such as a network connected server. Accordingly, display error determinations may be made more quickly than determinations made by a network server, and the determinations do not require network communication resources. Display error indications may enable users to create or edit display graphics with fewer display errors, which enhances the experience of other users that view the display graphic. In addition, reducing the number of display errors at a user device reduces time spent reviewing display graphics for errors and/or correcting errors by third parties that receive the display graphics, such as a web site publisher or content item management system.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Display graphics, such as display advertisements, may be designed by a user manipulating objects in a display area of the display graphics using a data processing apparatus. The systems and methods disclosed herein provide an error message to a user when a change to an object results in a display error.

A data processing apparatus may obtain the display position of each object rendered in a display area, and the contents of each object. For example, a display area may include a text object and an image object. The image object may be in the center of the display area, and the text object may be located near the top of the display area.

A user may manipulate an object included in the display area. For example, a user may add text to the text object, re-size the image object, or move the text object or image object. When an object has changed in some way, the data processing apparatus determines whether the change results in any display errors. A display error may indicate, for example, that objects overlap, that text exceeds the bounds of the text object, that an object exceeds the bounds of the display area, or that objects match the background color. When a display error is detected, the user may be notified of the display error.

Some or all of the foregoing features may be performed at a user device, without requiring communication with a server or other separate data processing apparatus.

Figure 1:
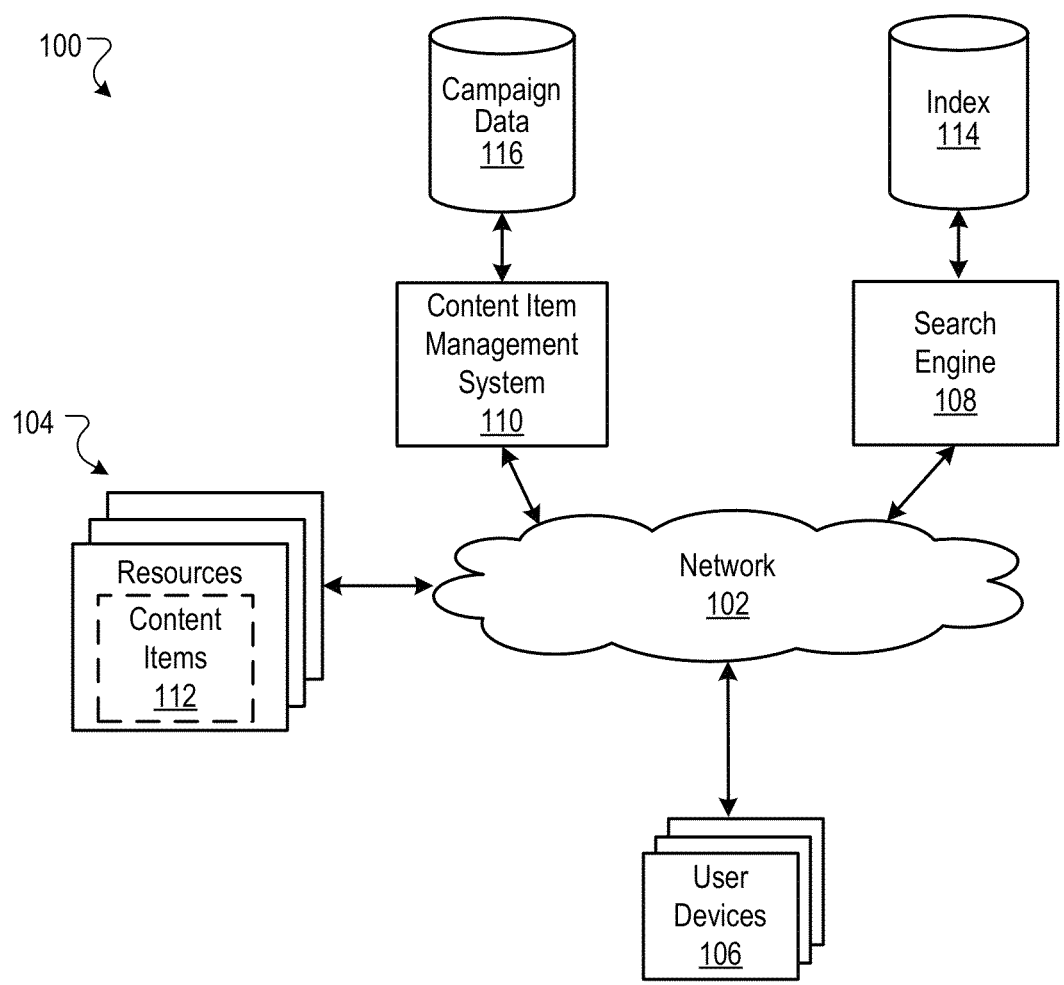
FIG. 1 is a block diagram of an example environment in which display error indications may be generated.

FIG. 1 is a block diagram of an example environment 100 in which display error indications are generated and provided to a user. A computer network 102, such as a local area network (LAN), wide area network (WAN), the Internet, or a combination thereof, connects resources 104, user devices 106, a search engine 108, and a content item management system 110. The example environment 100 may include many thousands of resources 104 and user devices 106.

A resource 104 is any data that can be provided by the publisher 104 over the network 102 and that is associated with a resource address. Resources include HTML pages, word processing documents, and portable document format (PDF) documents, images, video, and feed sources, to name just a few. The resources can include content, such as words, phrases, pictures, and so on, and may include embedded information (such as meta information and hyperlinks) and/or embedded instructions (such as JavaScript scripts). Resources 104 may also include one or more content items 112, such as display graphics.

A user device 106 is an electronic device that is under the control of a user and is capable of requesting and receiving resources 104, content items 112, and other content over the network 102. User devices 106 may also be capable of communicating directly with the content item management system 110. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website on the world wide web or a local area network.

In some implementations, user devices 106 may submit search queries to a search engine 108. In response to the search request, the search engine 108 uses an index 114 to identify resources that are relevant to the queries. The search engine 108 identifies the resources in the form of search results and returns the search results to the user devices 106 in search results page resource. An example search result can include a web page title, a snippet of text extracted from the web page, and the URL of the web page.

The user devices 106 receive the search results pages and render the pages for presentation to users. In response to the user selecting a search result at a user device 106, the user device 106 requests the resource identified by the resource locator included in the selected search result. The publisher of a web site that hosts the resource may receive the request for the resource from the user device 106 and provide the resource to the requesting user device 106.

The content item management system 110 facilitates the creation of content items 112 and the provisioning of content items 112 with the resources 104. Content items 112 are units of content that are inserted into resources in response to a content item request. For example, a user device 106 may request a content item 112, e.g., a display advertisement, from the content item management system 110 at the same time a resource 104 is requested from a publisher. Content items can include content, for example, informational, educational, or entertainment content, as well as videos, applications, audio files, images, display graphics, and advertisements in the form of graphical advertisements, such as banner advertisements, text only advertisements, image advertisements, audio advertisements, video advertisements, advertisement gadgets with or without interactive features, advertisements combining one or more of any such components, etc., or any other type of electronic advertisement or content item document. The content items may also include embedded information, such as links, meta-information, and/or machine executable instructions, such as HTML or scripts. The content item management system 110 may also include a data storage system that stores campaign data 116. The campaign data 116 may store content items and other information related to content item campaigns, such as selection criteria for content items, performance information, and budget information.

Content items 112 may be created by a user on a user device 106, at the content item management system 110, or using a combination of a user device 106 and content item management system 112. For example, the content item management system 110 may provide an environment in which display advertisements may be created by a user that is connected to the content item management system 110 via a user device 106. In some implementations the content items may be created, in whole or in part, at the user device 106 and without interaction with a separate system, such as the content item management system 110.

While the example environment 100 depicts the subject matter of this application operating in a networked environment, the subject matter may also be performed entirely by a single data processing apparatus, e.g., at a user device. Further detail regarding the operation of the user device 106 is provided in the paragraphs that follow. In addition, the following paragraphs describe the subject matter of this application in the context of display advertisements, but the subject matter is equally applicable to all content items, display graphics, and other data having display areas capable of manipulation by a user.

Figure 2A:
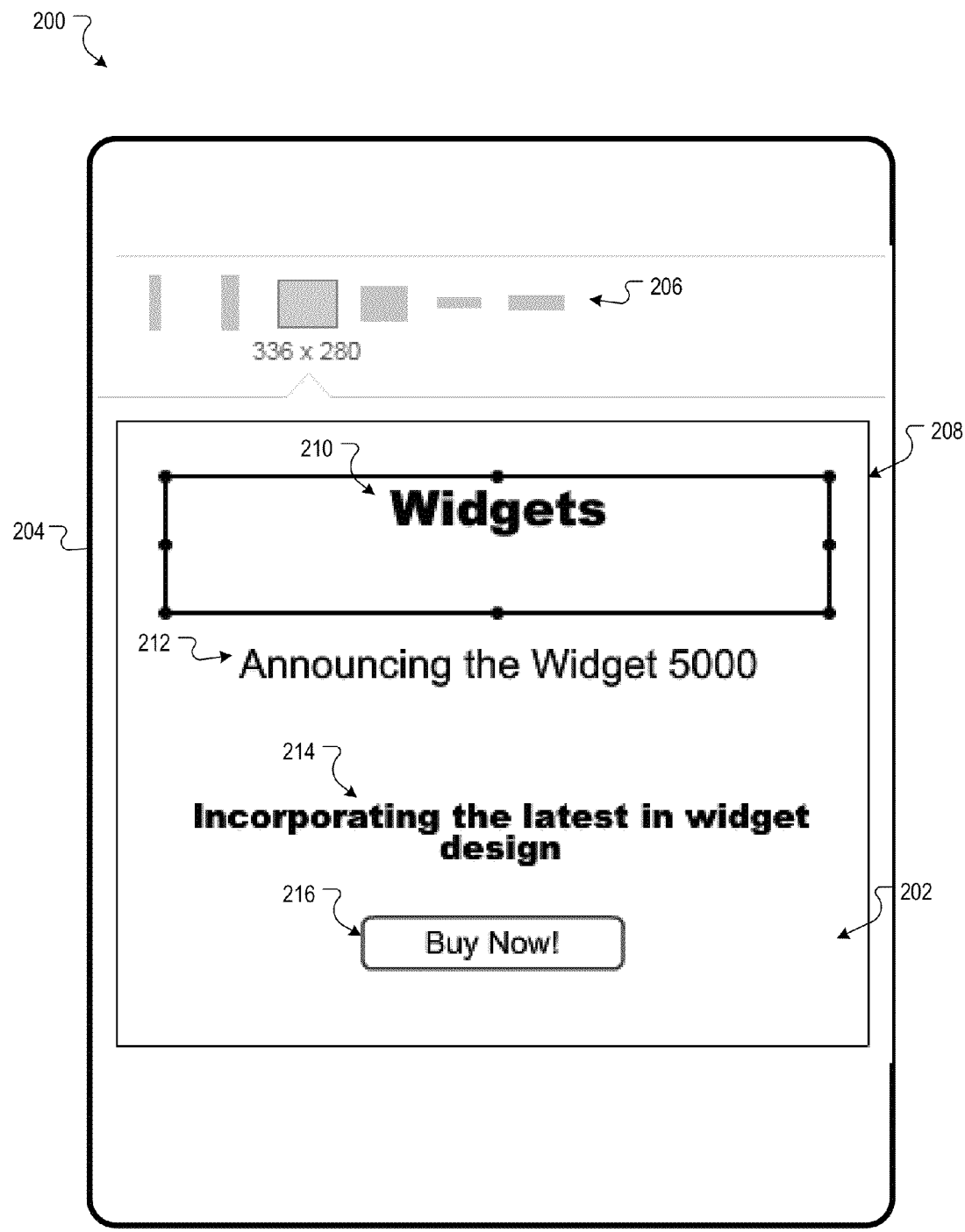
FIG. 2A is an illustration of an example environment including a first example display area.

FIG. 2A is an illustration of an example environment 200 including a first example display area 202. The first example display area 202 may be defined by data accessed by or at a user device. The example environment 200 also includes an example viewport boundary 204 of a user device. Data displayed within the viewport boundary 204, such as the first example display area 202, is data rendered by the user device, e.g., data that may be viewed by a user of the user device.

In some implementations, such as the implementation depicted in the example environment 200, a single display area, represented by the display area border 208, is shown to a user, while other display areas are represented by display area indicators 206. For example, the display area indicators 206 may appear as thumbnail representations of the respective display areas. In some implementations, selecting a display area indicator 206 causes the user device to render the display area that corresponds to the selected display area indicator. In the example environment 200, the dimensions of the selected display area are shown below the thumbnail representation of the selected display area. For example, the selected display area has a width of 336 pixels and a height of 280 pixels. In some implementations, a display area indicator of the selected display area may also be highlighted to provide a visual indication to the user.

Each display area, such as the first example display area 202, has a respective display area border, e.g., display area border 208, which corresponds to the first example display area 202. The display area border may or may not be visible to a user, and generally defines the boundaries of the display area, e.g., the display area border 208 surrounds a display area that has a width of 336 pixels and a height of 280 pixels. In some implementations, each display area has a size that is different from each other display area, as indicated by the different rectangular display area indicators 206.

Objects may be rendered in the display area, such as text objects, shape objects, image objects, or hyperlink objects, just to name a few. In the first example display area 202, three text objects (e.g., 210, 212, and 214) are displayed, as well as a button object 216. Data defining each object may indicate the display position of the object within the display area, the display dimensions of the object, and content data that defines the contents of the object. For example, data defining text object 210 may indicate the display position of the text object 210, e.g., X, Y coordinates indicating a position within the display area 202. The data may also indicate the display dimensions of the text object 210, e.g., in pixels, and content data that defines the contents of the text object 210, e.g., the text, "Widgets," as well as the position, dimensions, font, and pixel data. Pixel data may specify, for example, the position and color of each pixel of an object. In some implementations, display data for an object may also indicate an object's depth, or Z-axis position, which defines a depth of an object with respect to other objects in the display area.

Figure 2B:
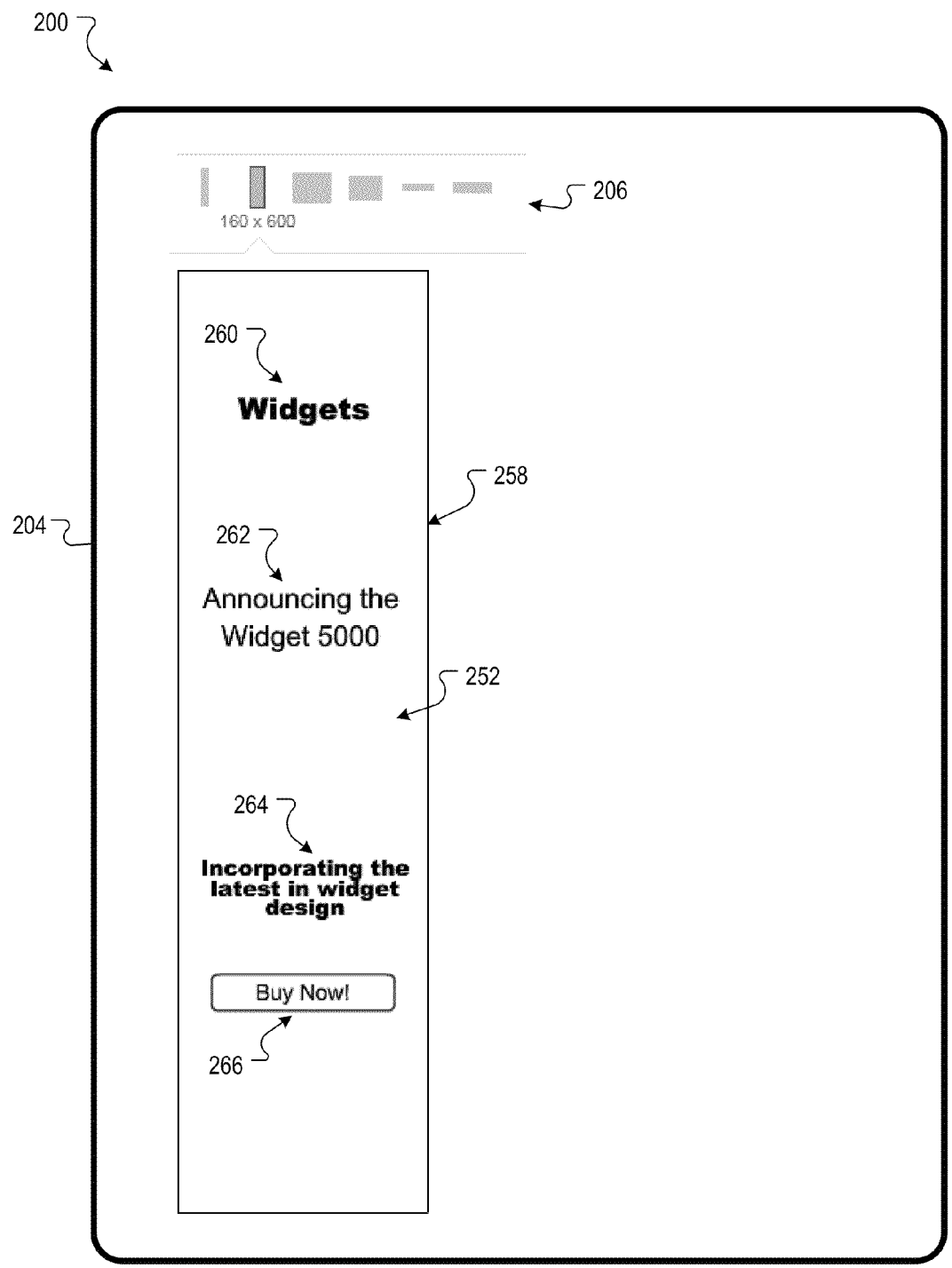
FIG. 2B is an illustration of the example environment including a second example display area.

FIG. 2B is an illustration of the example environment 250 including a second example display area 252. The second example display area 252 may also be defined by data accessed by or at a user device, and the data may be rendered within the same viewport boundary 204 in which the first example display area was rendered. In the example environment 250, a thumbnail representation of the second example display area 252 is depicted in a row of thumbnail representations 206. The thumbnail representation of the second example display area 252 is highlighted to indicate that its corresponding display area is the currently selected display area. In addition, the dimensions of the selected display area, e.g., 160×600, are shown beneath the thumbnail representation of the second example display area 252.

Each object within the second example display area 252 corresponds to a respective object in each other display area. For example, the text objects displayed in the second example display area 252 (e.g., 260, 262, and 264) correspond to the three text objects displayed in the first example display area 202 (e.g., 210, 212, and 214). The button object 266 displayed in the second example display area 252 corresponds to the button object 216 displayed in the first example display area 202. In some implementations, corresponding objects may have identical or similar display data. For example, text object 260 may have content data identical to content data for its corresponding text object 210, but the display positions and display dimensions of each object may be different.

In some implementations, changing the display data of an object displayed in one display area also causes a change in the corresponding object in each other display area. For example, changing the color of the text in text object 260 may also cause an identical change in color to occur in corresponding text object 210. In addition, adding or removing text in the button object 266 may cause an identical change in the corresponding button object 216. In some implementations, certain changes may not cause an identical change to occur in a corresponding object in other display areas. For example, changing the display position of text object 212 may not cause a respective change in the display position of the corresponding text object 262. In addition, if a user resizes the button object 216, the corresponding button object 266 may not be resized.

When user input is received that specifies a change in the display data of an object, a determination is made as to whether the change causes a display error in the selected display area. As described below, similar determinations may be made for each other display area. For example, if the color of the text included in a text object is changed, a determination may be made as to whether the change in text color causes an error. An error may occur, for example, if there is not enough contrast between the color of the text and a background color of the display area, which may result in difficulty for a user viewing the text. This may be determined, for example, by comparing the pixel color of a particular pixel of the text object to the pixel color of a corresponding pixel in the same position (e.g., same X, Y coordinates) in the background of the display area. If the pixel colors are the same or within a threshold measure of difference from one another, the change may cause a display error.

Any suitable method for determining pixel color similarity may be used. One example way of determining one pixel's color is too similar to another pixel's color is by comparing hex values of each pixel color, and determining that there is not enough contrast between the two if they are within a threshold measure of difference from one another. Another example method of determining pixel color similarity includes comparing hue, saturation, and brightness values for pixels.

In some situations, such as when an object overlaps another object, a comparison of pixel colors may be made with respect to the pixels of the overlapping portions of the objects as opposed to the background color of a display area. For example, a text object including white text may be displayed on top of a black button object, and both objects may be included in a display area having a white background. The contrast between black and white will not cause a display error, and the color of the first object would not be compared to the background color because the display data of the white text object indicates that it is on top of the black button object.

Similar determinations are made for each respective object in each of the other display areas. For example, a user may cause a change in the display dimensions of the button object 216 included in the first example display area 202, such that the button object is doubled in width. While this may not cause an error in the first example display area 202, the second example display area 252 is not as wide as the first, and a corresponding change to the button object 266 in the second example display area may cause the button object to be too wide to fit within the display area. This may be determined, for example, by obtaining a display position and display dimensions for the button object, calculating edges for the button object, and determining if an edge of the button object intersects with the display area border 258.

In the example environment 200, display error determinations may be made for each display area that has a corresponding thumbnail representation in the row of thumbnail representations 206. Changing an object in one display area may not result in a display error for that particular display area, but the change may cause an error in other display areas that have different dimensions and/or object positions. For each display area for which a change in an object's display data causes a display error, an error indication may be generated. Error indications are described more specifically with reference to FIGS. 3A and 3B in the paragraphs that follow.

Figure 3A:
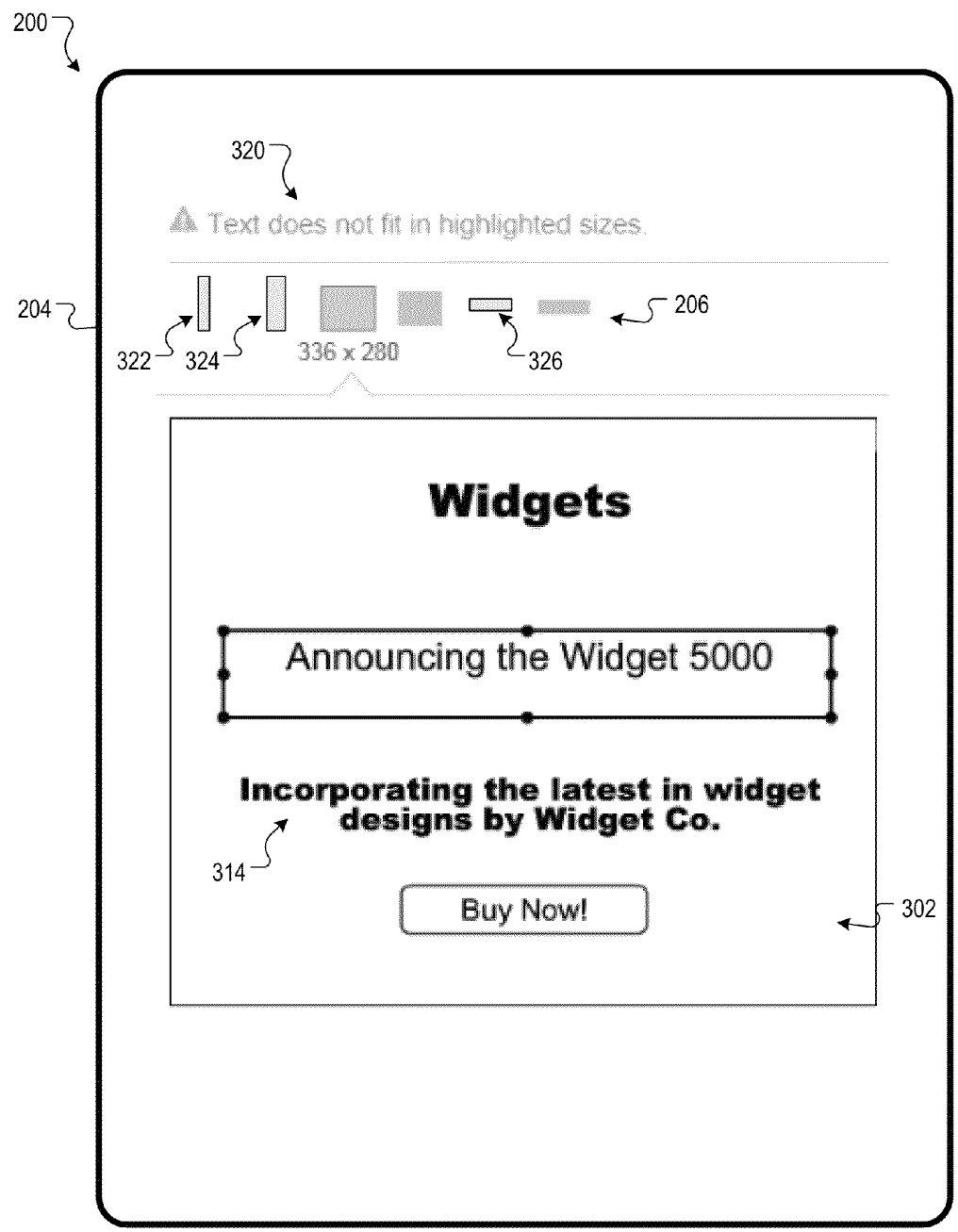
FIG. 3A is an illustration of the example environment including an example display error indication.

FIG. 3A is an illustration of the example environment 200 including an example display error indication 320. In the example environment 200, the display error indication 320 is an error message that specifies "Text does not fit in highlighted sizes." In the row of thumbnail representations 206, three of the thumbnail representations are highlighted, 322, 324, and 326. The display error indication 320 specifies that the display areas that correspond to the three highlighted thumbnail representations each have a display error. The currently selected display area, e.g., display area 302, does not have the error specified by the error indication 320, and thus, its corresponding thumbnail representation is not highlighted.

By way of example, assume that user input specified a change to the text object 314. For example, assume that the text object was changed from "Incorporating the latest in widget designs" to "Incorporating the latest in widget designs by Widget Co." The additional text did not cause any display errors in the currently selected display area 302, but the change did cause errors in three other display sizes. For example, adding "by Widget Co." to the text object may have caused the text to exceed the display dimensions of text objects that correspond to text object 314 in the display areas that are represented by the highlighted thumbnails, 322, 324, and 326. In some implementations, a user may be required to select each individual display area for which the change caused a display error and move or resize the objects that cause the error in order to correct it.

Figure 3B:
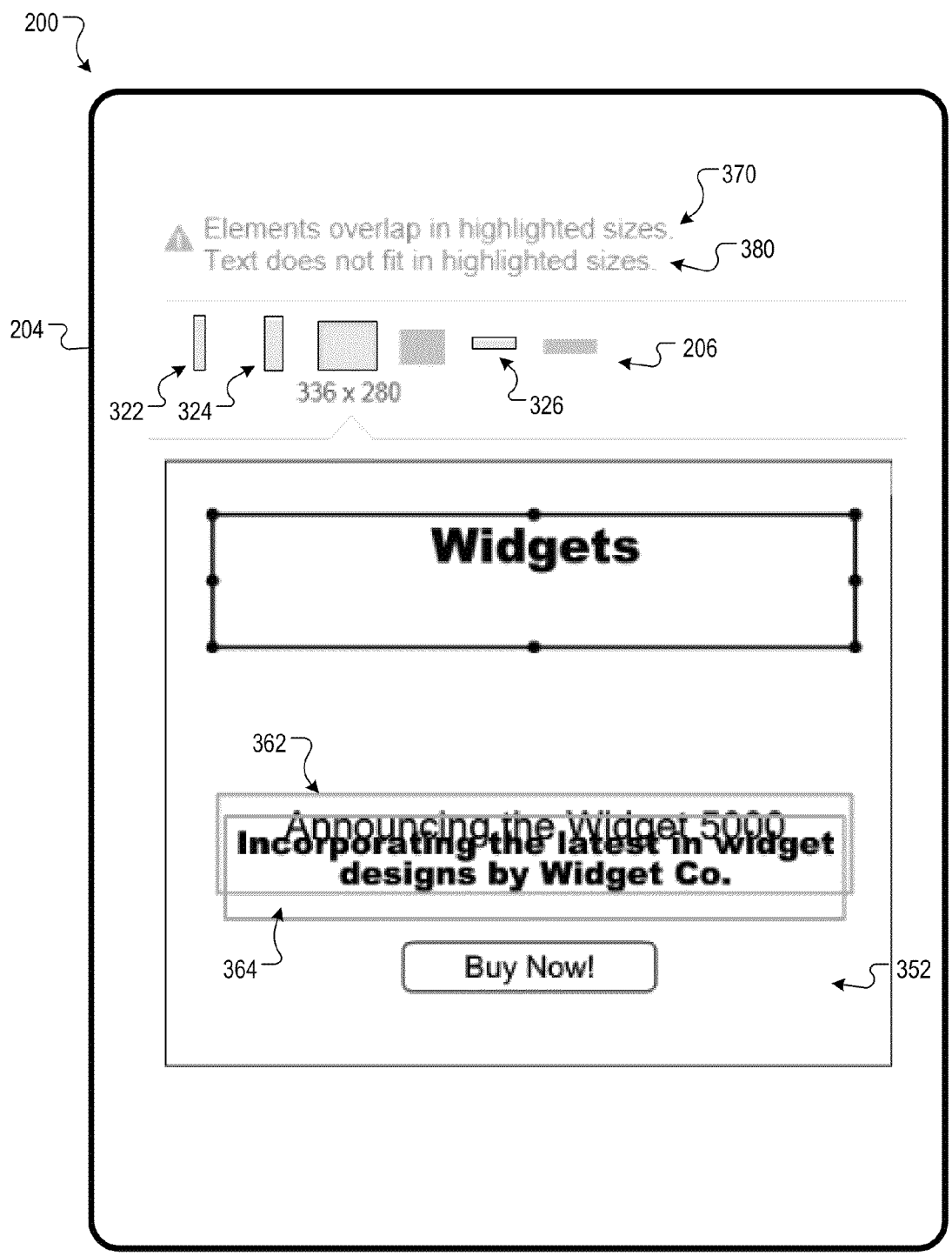
FIG. 3B is an illustration of the example environment including two example display error indications.

In some implementations, one or more changes may cause multiple display errors. FIG. 3B is an illustration of the example environment 200 including two example display error indications. In the example environment 200, the first display error indication 370 is an error message that specifies "Elements overlap in highlighted sizes," and the second display error indication 380 is an error message that specifies "Text does not fit in highlighted sizes." In the row of thumbnail representations 206, four of the thumbnail representations are highlighted, including the thumbnail representation of the selected display area 352. In some implementations, a single error message may be displayed when the corresponding error occurs on multiple display areas.

In the example environment 200, the currently selected display area 352 includes two intersecting, or overlapping, objects—e.g., text object 364 and text object 362. In some implementations, an intersection of objects may cause a display error. An intersection of objects may be defined by the content of one object intersecting with, or overlapping, the content of another object. For example, some of the text included in the text object 362 intersects with some of the text included in the text object 364. An intersection may be determined, for example, by determining if one or more pixels that comprise the text of an object occupy the same location (e.g., X,Y coordinates) as a pixel that comprises the text of another object.

Figure 4:
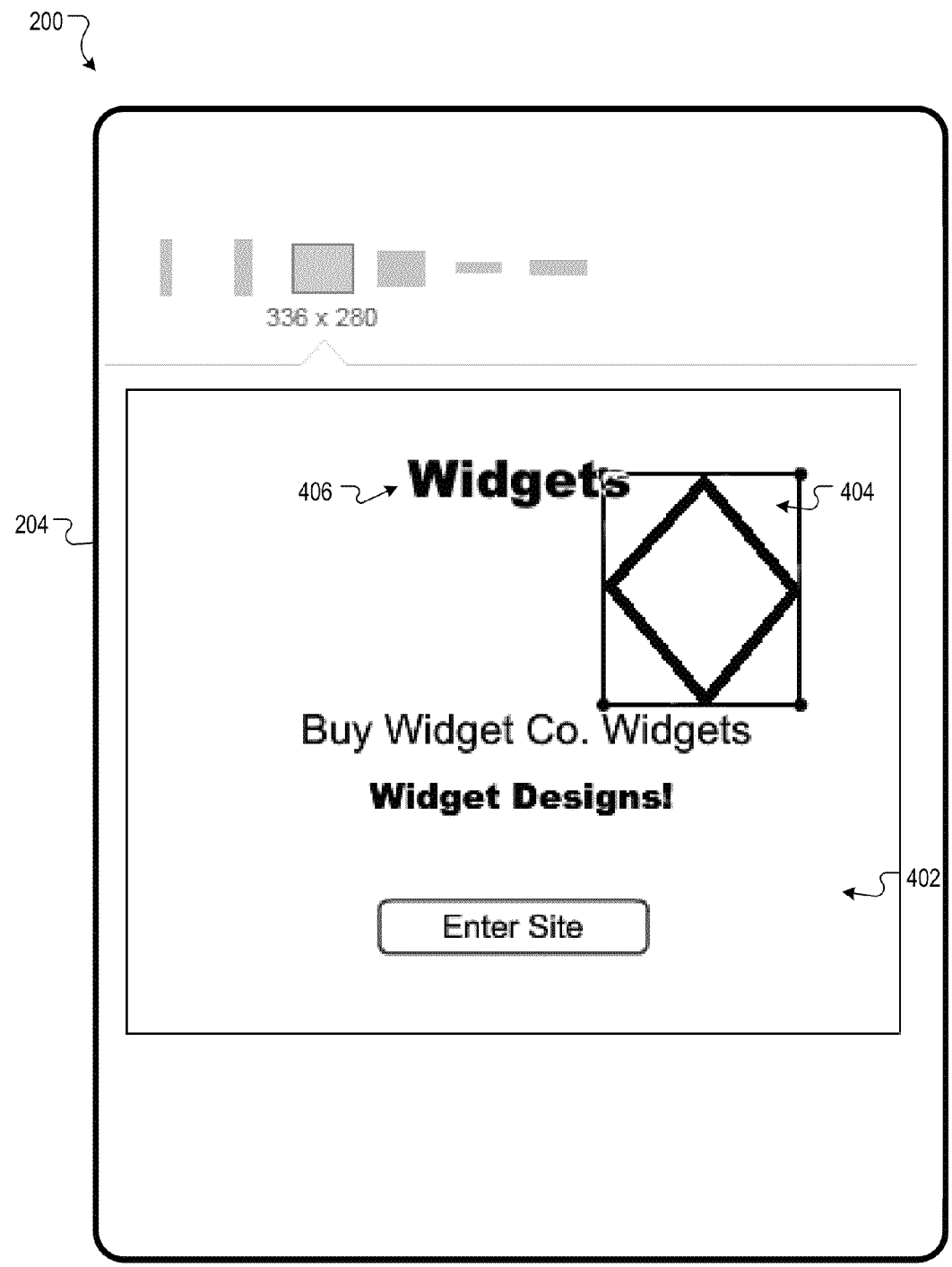
FIG. 4 is an illustration of the example environment including an example display area having intersecting objects.

In some implementations, such as the implementation shown in FIG. 4, an intersection of objects only causes a display error when an intersection of content indicates two or more non-transparent pixels occupy the same location of a display area. FIG. 4 is an illustration of the example environment 200 including an example display 402 area having intersecting objects. For example, graphic object 404 intersects with text object 406. In this implementation, the intersection does not cause a display error because the portion of graphic object 404 that overlaps the text of text object 406 is comprised of transparent pixels, e.g., pixels with an alpha channel setting to be fully transparent.

In some implementations, objects that are the cause of one or more display errors may have display error indications, such as highlighting. For example, in the example environment 200, the text objects 362 and 364 are both highlighted by an enclosing box, which indicates that the objects are currently causing a display error. In some implementations, different types of highlighting may be used to indicate which display areas and/or objects are having which errors. For example, thumbnail representations may be highlighted in different colors, or may be enclosed in borders of different colors, and each color may correspond to a different type of display error.

Display error indications may, in some implementations, simply provide notice to a user of potential problems with the display of a content item. In addition, if a later change to a display area fixes one or more errors, the error indications may be removed. The manipulation of objects, determination of errors, and generation of error indications may be done entirely at a user device, without requiring any communication with another data processing apparatus, such as a content item management system. In some implementations, determination of errors and generation of error indications may be performed by any combination of user devices and other data processing apparatus, such as a content item management system. For example, a user device may be used to make changes to a display area and send a request to the content item management system for a review of the display area to determine display errors.

In some implementations, display error indications may be determined independently by, or submitted to, a data processing apparatus, such as the content item management system. A content item management system may use display errors to prevent distribution of content items. For example, some content items that have certain display errors will not be eligible for distribution to user devices in response to content item requests until the display errors are corrected. Some display errors, on the other hand, may not prevent distribution of content items. In some implementations, display errors and display error indications may prevent a data processing apparatus from storing a content item with display errors in a data storage device. In some implementations, display errors may simple be logged in a data storage device, e.g., for debugging purposes, without displaying them.

Figure 5:
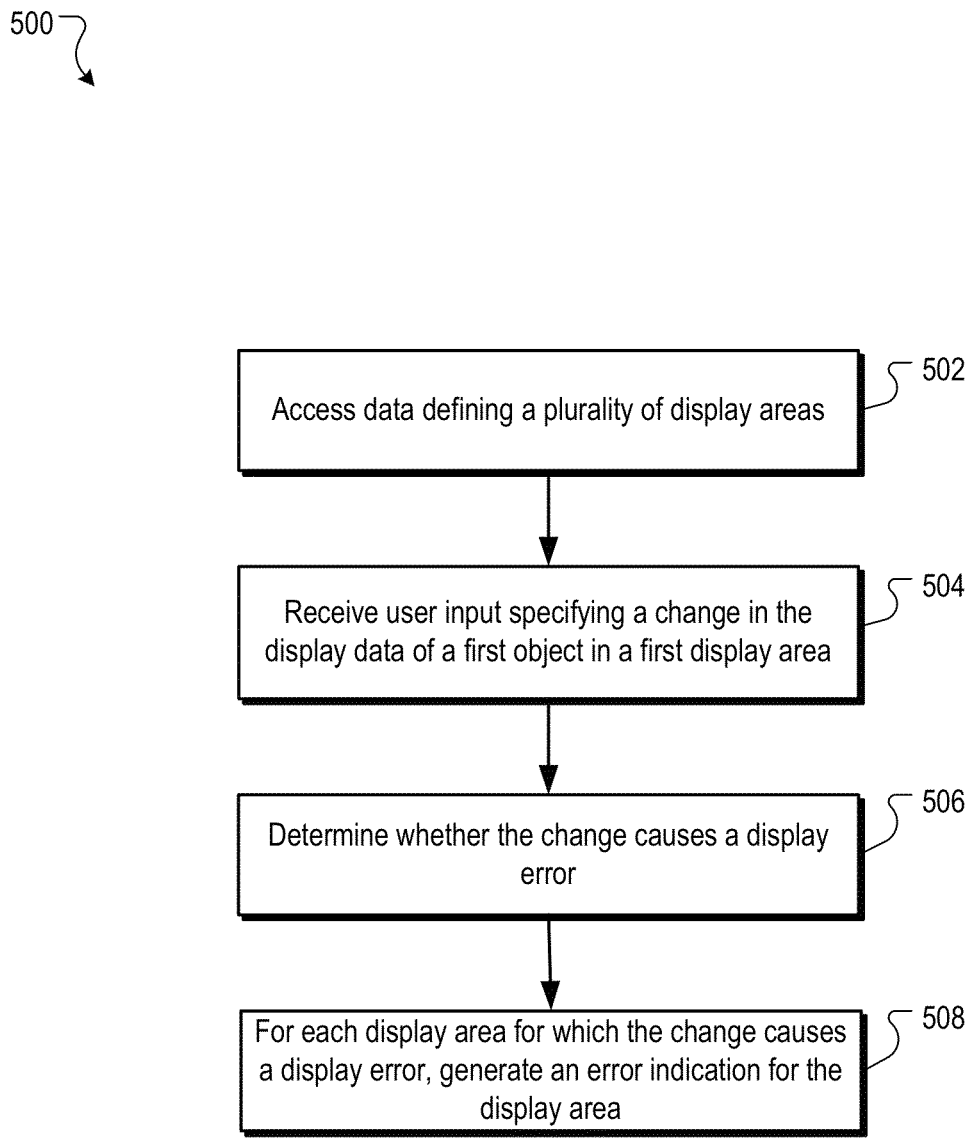
FIG. 5 is a flow diagram of an example process in which display errors are generated.

FIG. 5 is a flow diagram of an example process 500 in which display errors are generated. The process 500 may be used by a data processing apparatus, such as a user device, or a content item management system.

The process 500 accesses data defining a group of display areas (502). In some implementations, the data defines, for each display area, respective display area borders that are different from display area borders of other display areas in the group of display areas. The data may, for example, define multiple display areas for a display advertisement, and each display area may be a different size display area defined by a respective display area border.

In some implementations, the accessed data may also define, for each display area, display data for a group of objects that are rendered in the display area. For example, the display data may define, for each object, a display position of the object within the display area, display dimensions of the object, and content data defining content of the object. In some implementations, each object in each display area corresponds to a respective object in each other display area. For example, certain manipulations of the display data for an object may cause an identical or similar change in the display data for each respective object that corresponds to the manipulated object.

User input is received that specifies a change in the display data of a first object in a first display area (504). For example, user input may specify a change in the size of an image object included in a display advertisement. The change will result in a change in the display dimensions of the image object and the content data defining the content of the object—e.g., pixel data—and the change may also change the display position of the object. In some implementations, the change also causes a corresponding change to respective objects in other display areas. Adding or removing an object in a display area may also be considered a change in the display data of an object in a display area.

In response to receiving the user input, the process 500 determines whether the change causes a display error for the first object in the first display area and for any respective object in each of the other display areas (506). In some implementations, a display error for an object may indicate that the content of the object intersects with content of another object included in the same display area. For example, an intersection of content may be defined by two or more non-transparent pixels to occupying the same location of a display area, e.g., when resizing an image object causes a colored pixel in the image object to occupy the same location as a colored pixel in a text object.

In some implementations, a display error for an object may indicate that the content of the object intersects with a display area border of the display area that includes the object. For example, an intersection of the content of an object with a display area border is defined by at least a portion of the content exceeding the area defined by the display area border.

In some implementations, a display error for an object may indicate that the content of the object exceeds the display dimensions of the object. A display error for an object may also indicate, in some implementations, that the content of the object intersects with a background of the display area that includes the object and the color of the background is substantially similar to the color of the content. For example, black text on a black background, or light gray text on a white background, may cause a display error. In addition, a display error may also indicate that the content of an object intersects with the content of another object, and the color of the content of other object is substantially similar to the content of the object. For example, black text on a black image, or yellow text on an orange button object.

For each display area for which a change causes a display error, the process (500) generates an error indication for the display area (508). In some implementations, an error indication for a display area includes text specifying a cause of the error. For example, text of an error indication for a display area may specify "Text does not fit in highlighted sizes." In some implementations, each display area has a corresponding thumbnail representation, and the error indication for each display area includes an adjustment to the thumbnail representation of the display area. For example, a thumbnail representation may be highlighted in a certain color in response to determining that a change caused a display error for the display area that corresponds to the thumbnail representation.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   accessing data defining a plurality of display areas, the data defining, for each display area:
   respective display area borders that are different from display area borders of other display areas in the plurality of display areas; and
   display data for each of a plurality of objects that are rendered in the display area, the display data defining, for each object:
   a display position of the object within the display area;
   display dimensions of the object; and
   content data defining content of the object;
   wherein each object in each display area corresponds to a respective object in each other display area;
   receiving user input specifying a change in the display data of a first object in a first display area and, in response, determining whether the change causes a display error for the first object in the first display area and for any respective object in each of the other display areas; and for each display area for which the change causes a display error, generating an error indication for the display area, wherein the display error for the object indicates at least one of the content of the object intersects with content of another object included in the same display area, the content of the object intersects with a display area border of the display area that includes the object, the content of the object exceeds the display dimensions of the object, or the content of the object intersects with a background of the display area that includes the object and the color of the background is substantially similar to the color of the content.

2. The method of claim 1, wherein an intersection of content is defined by two or more non-transparent pixels occupying the same location of a display area.

3. The method of claim 1, wherein an intersection of the content of an object with a display area border is defined by at least a portion of the content exceeds the area defined by the display area border.

4. The method of claim 1, wherein the error indication for the first display area comprises text specifying a cause of the error.

5. The method of claim 1, wherein each display area has a corresponding thumbnail representation, and wherein the error indication for each other display area comprises an adjustment to the thumbnail representation of the other display area.

6. The method of claim 1, wherein the error indication, for each of the display areas for which the change caused a display error, comprises an adjustment to the object for which the change caused a display error.

7. A system comprising:
a data processing apparatus; and
a data store storing instructions that, when executed by the data processing apparatus, cause the data processing apparatus to perform operations comprising:
accessing data defining a plurality of display areas, the data defining, for each display area:
respective display area borders that are different from display area borders of other display areas in the plurality of display areas; and
display data for each of a plurality of objects that are rendered in the display area, the display data defining, for each object:
a display position of the object within the display area;
display dimensions of the object; and
content data defining content of the object;
wherein each object in each display area corresponds to a respective object in each other display area;
receiving user input specifying a change in the display data of a first object in a first display area and, in response, determining whether the change causes a display error for the first object in the first display area and for any respective object in each of the other display areas; and
for each display area for which the change causes a display error, generating an error indication for the display area, wherein the display error for the object indicates at least one of the content of the object intersects with content of another object included in the same display area, the content of the object intersects with a display area border of the display area that includes the object, the content of the object exceeds the display dimensions of the object, or the content of the object intersects with a background of the display area that includes the object and the color of the background is substantially similar to the color of the content.

8. The system of claim 7, wherein an intersection of content is defined by two or more non-transparent pixels occupying the same location of a display area.

9. The system of claim 7, wherein an intersection of the content of an object with a display area border is defined by at least a portion of the content exceeds the area defined by the display area border.

10. The system of claim 7, wherein the error indication for the first display area comprises text specifying a cause of the error.

11. The system of claim 7, wherein each display area has a corresponding thumbnail representation, and wherein the error indication for each other display area comprises an adjustment to the thumbnail representation of the other display area.

12. The system of claim 7, wherein the error indication, for each of the display areas for which the change caused a display error, comprises an adjustment to the object for which the change caused a display error.

13. A non-transitory computer readable medium comprising instructions that, when executed by a data processing apparatus, cause the data processing apparatus to perform operations comprising:
accessing data defining a plurality of display areas, the data defining, for each display area:
respective display area borders that are different from display area borders of other display areas in the plurality of display areas; and
display data for each of a plurality of objects that are rendered in the display area, the display data defining, for each object:
a display position of the object within the display area;
display dimensions of the object; and
content data defining content of the object;
wherein each object in each display area corresponds to a respective object in each other display area;
receiving user input specifying a change in the display data of a first object in a first display area and, in response, determining whether the change causes a display error for the first object in the first display area and for any respective object in each of the other display areas; and
for each display area for which the change causes a display error, generating an error indication for the display area, wherein the display error for the object indicates at least one of the content of the object intersects with content of another object included in the same display area, the content of the object intersects with a display area border of the display area that includes the object, the content of the object exceeds the display dimensions of the object, or the content of the object intersects with a background of the display area that includes the object and the color of the background is substantially similar to the color of the content.

14. The computer readable medium of claim 13, wherein an intersection of content is defined by two or more non-transparent pixels occupying the same location of a display area.

15. The computer readable medium of claim 13, wherein an intersection of the content of an object with a display area border is defined by at least a portion of the content exceeds the area defined by the display area border.

16. The computer readable medium of claim 13, wherein the error indication for the first display area comprises text specifying a cause of the error.

17. The computer readable medium of claim 13, wherein each display area has a corresponding thumbnail representation, and wherein the error indication for each other display area comprises an adjustment to the thumbnail representation of the other display area.

* * * * *